(12) United States Patent
Reinertsen

(10) Patent No.: US 8,752,203 B2
(45) Date of Patent: Jun. 10, 2014

(54) SYSTEM FOR MANAGING COMPUTER DATA SECURITY THROUGH PORTABLE DATA ACCESS SECURITY TOKENS

(76) Inventor: Lars Reinertsen, London (GB)

( * ) Notice: Subject to any disclaimer, the term of this patent is extended or adjusted under 35 U.S.C. 154(b) by 67 days.

(21) Appl. No.: 13/526,200

(22) Filed: Jun. 18, 2012

(65) Prior Publication Data

US 2013/0340093 A1    Dec. 19, 2013

(51) Int. Cl.
*G06F 21/62*    (2013.01)
(52) U.S. Cl.
USPC .................. 726/28; 726/4; 713/170; 713/185
(58) Field of Classification Search
USPC ............................................................ 726/28
See application file for complete search history.

(56) References Cited

U.S. PATENT DOCUMENTS

| | | | |
|---|---|---|---|
| 7,895,445 B1* | 2/2011 | Albanese et al. | 713/185 |
| 8,037,538 B2* | 10/2011 | Baba et al. | 726/27 |
| 8,108,311 B2* | 1/2012 | Herlitz | 705/51 |
| 2002/0156726 A1* | 10/2002 | Kleckner et al. | 705/39 |
| 2003/0033528 A1* | 2/2003 | Ozog et al. | 713/170 |
| 2004/0003260 A1* | 1/2004 | Hawkes et al. | 713/185 |
| 2005/0144463 A1* | 6/2005 | Rossebo et al. | 713/185 |
| 2007/0055867 A1* | 3/2007 | Kanungo et al. | 713/156 |
| 2007/0289004 A1* | 12/2007 | Chao et al. | 726/9 |
| 2011/0264585 A1* | 10/2011 | Abdulhayoglu | 705/50 |
| 2012/0284506 A1* | 11/2012 | Kravitz et al. | 713/151 |
| 2012/0323691 A1* | 12/2012 | McLaughlin et al. | 705/14.58 |
| 2012/0324542 A1* | 12/2012 | McLaughlin et al. | 726/4 |

\* cited by examiner

*Primary Examiner* — Kambiz Zand
*Assistant Examiner* — Yonas Bayou
(74) *Attorney, Agent, or Firm* — Gordon & Rees LLP

(57) ABSTRACT

A secure data storage system for controlling access having a data user facility, a data owner facility and a data storage facility, wherein a third party data holder managing the data storage facility grants the data user access to the data without knowing the identities of the data user or data owner.

13 Claims, 3 Drawing Sheets

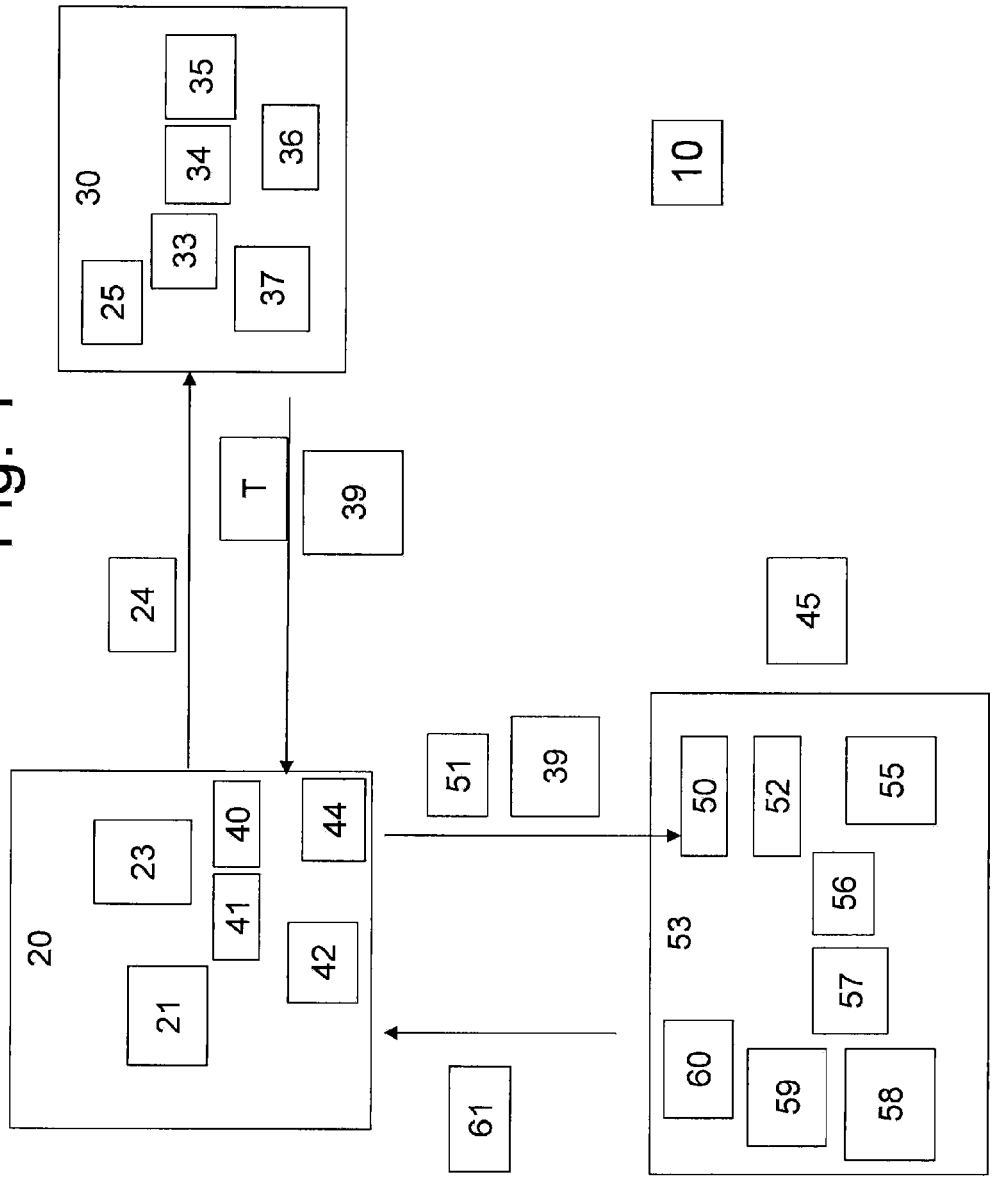

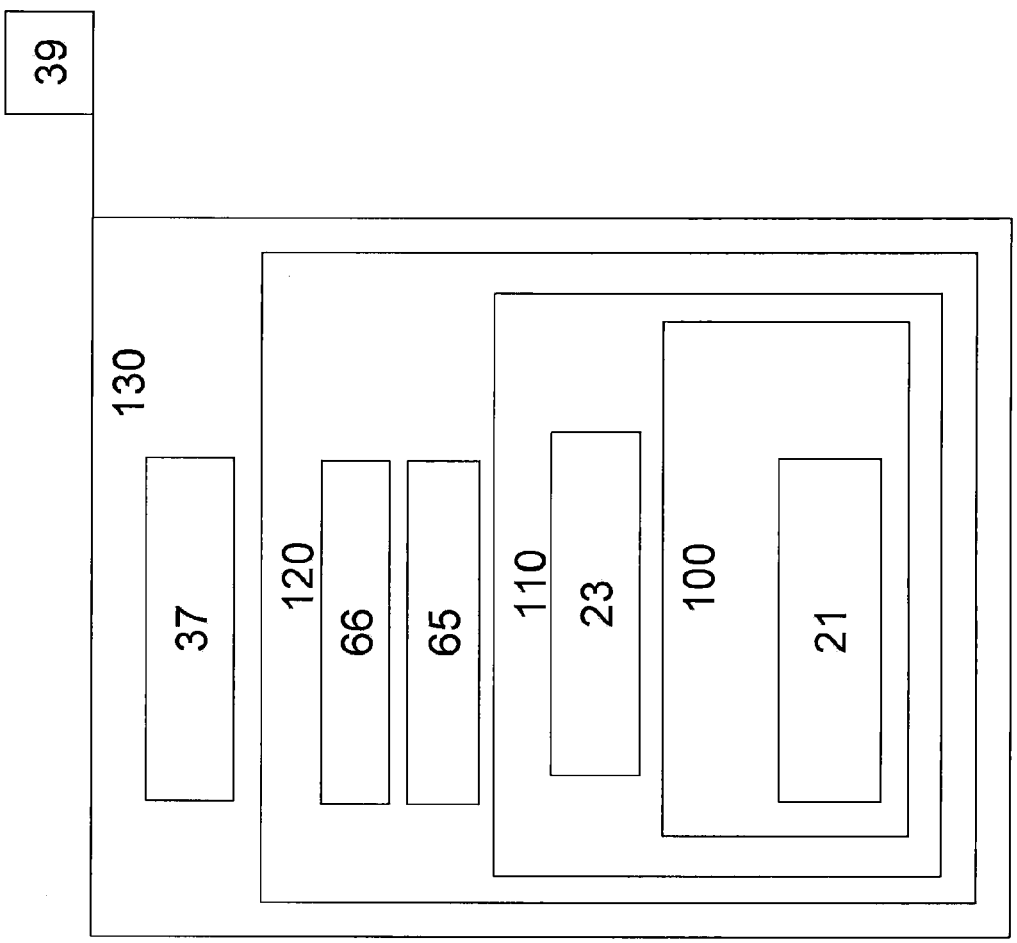

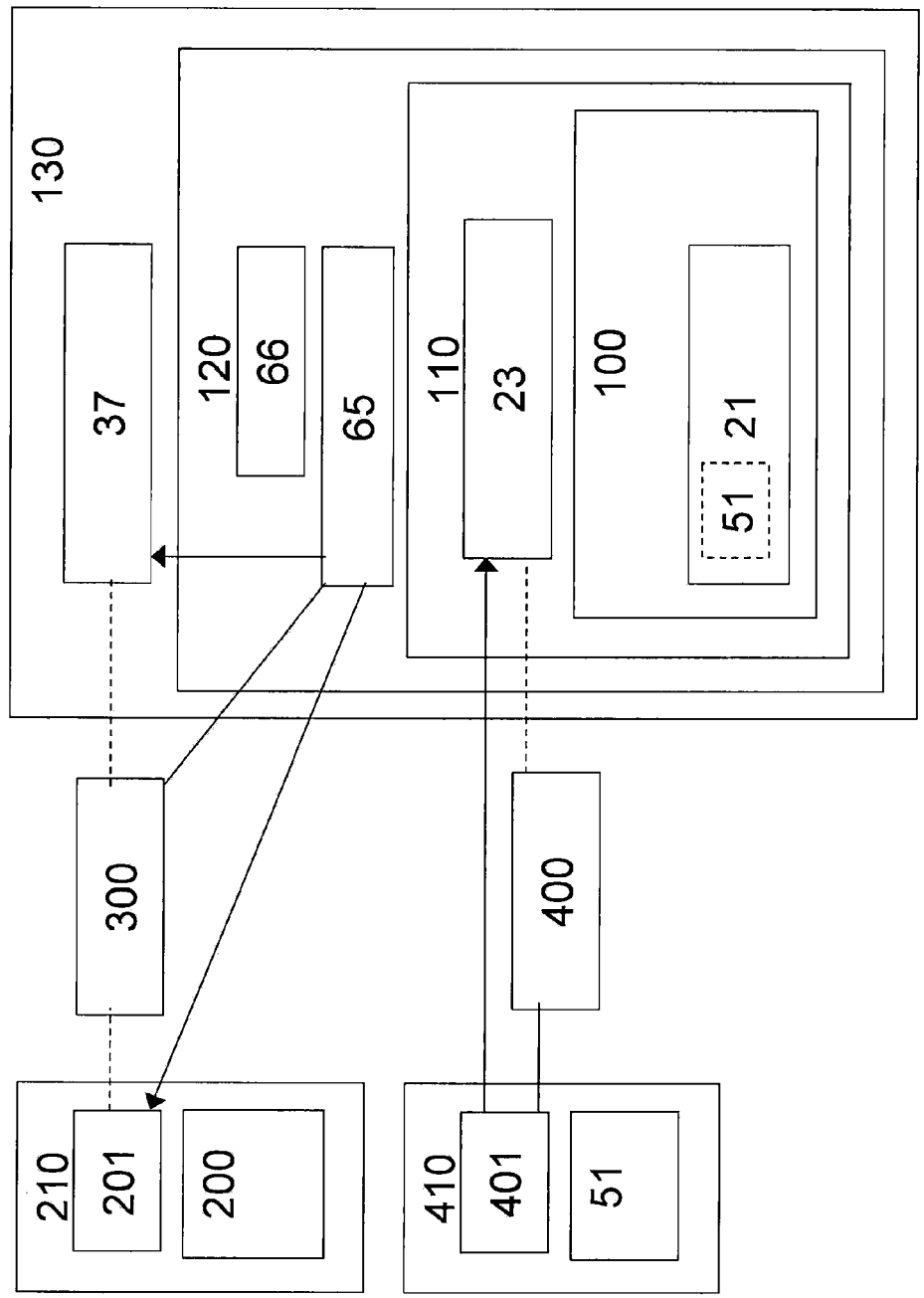

SYSTEM FOR MANAGING COMPUTER DATA SECURITY THROUGH PORTABLE DATA ACCESS SECURITY TOKENS

TECHNICAL FIELD

The present invention relates to computer security systems in general, and to systems for permitting user access to data held by third parties in particular.

SUMMARY OF THE INVENTION

The present invention creates a portable data access security token that can be used to grant authorized access to data without the authorizing entity having to know the identities of either of the requestor or the owner of the data. As such, it provides a system for third parties (who are in actual possession of the data) to meaningfully enforce access to the data without having any knowledge of the identities of either the owners or the users of the data.

One advantage of the present invention is that third parties can enforce access decisions without knowing either the data owner or the data user. Thus, another advantage of the present invention is that the data user can get authorized access to the data even when the data owner is not available. Yet another advantage of the present invention is that the data owner can grant access to the data without having to host the data on their own infrastructure.

A benefit of the present system is that it can be used with distributed applications and data (i.e.: where the data is outside the knowledge and physical control of the data owner). For example, in the case of home entertainment systems, the user can buy a movie ticket on-line from a movie owner, signing the request to see the movie with the user's own private key contained on a swipe smart card. This ticket can optionally be in a disposable swipe card as well as be emailed to the user or distributed in other ways. The token is not security sensitive on its own as it can only be used by someone who is also in possession of the private key that signed it. The user subsequently goes to a movie theater and uses the swipe card at the entrance to gain access to the movie. The swipe card reader at the door verifies that the user has a token that grants access to see the movie as well as verifying that it is the same user who bought the token that is using it because the user's private key is also on the swipe card.

The same token can also be used to grant the user the authority to download and read a digital file containing the movie. This can be done anonymously, since the token and the users own private key would be enough to grant access. Therefore, expensive user authentication infrastructure is not required. Importantly, however, this digital file may already be pre-loaded onto the user's home entertainment system. Thus, there is no need for the user's home entertainment system to even be connected to the internet to purchase and view the movie. Instead, the user gains access to the movie when he has a token that grants access to it and not before. It is to be understood that the present invention also encompasses embodiments where the home entertainment system is connected to the internet—with the portable data access security token being obtained from the movie owner for use with an on-line movie rental company. Again, the advantage of the present system is that it can be used in both scenarios. This is because there is no need for the user to be authenticated or in any way known to the entity checking the token. Instead, the user only needs his private key to use his token. This is because public/private key pairs, digital signatures, key exchange and optionally digital certificates to package the public keys, are employed throughout.

BRIEF DESCRIPTION OF THE DRAWINGS

FIG. 1 is an illustration of the physical components, information flow and decision processes of the present invention.

FIG. 2 is an illustration of the creation, structure and content of the portable data access token (comprising a plurality of documents).

FIG. 3 is an illustration the data access token and it's relation to the data.

The number indications in all the figures match.

DETAILED DESCRIPTION OF THE DRAWINGS

In FIG. 1, the physical components and information flow between the components of the present invention is illustrated.

The present invention provides a data storage system 10 for controlling access to data. Data storage system 10 comprises three physical components, being a data user facility 20, a data owner facility 30 and a data storage and management facility 53. As will be explained, each of these three facilities are operated by three different persons/entities, with data transmitted there between so as to provide a secure system for controlling access to data.

First, data user facility 20 is operated by a data user. (The data user is someone who wants access to the data but neither holds/hosts the data nor is the owner of the data). The data user uses facility 20 to first create a request 21 to access data in a data storage facility. Multiple requests may be bundled together (e.g.: document 100 in FIG. 2 can contain any number of requests 21). Next, a data user signs the request 21/document 100 with the user's own private key and attaches this digital signature 23 to 100, thereby credentialing the data request as coming from the user (i.e.: creating document 110).

The user's public key is transmitted to the data owner and the two parties proceed to engage in a cryptographic "handshake" (24) were each party received the other's public key and uses this to verify that the other party is in possession of the matching private key. The public keys may optionally be transmitted in the form of public digital certificates which contain the public key as well as additional information about the party whose public key the certificate belong to, such as name and address. When public certificates are exchanged in this way the cryptographic key change process is called an SSL handshake. After the cryptographic handshake 24, the data owner is in possession of the user's public key and has confidence that the data user is in possession of the private key that matches it. The user then proceeds to transmit the digitally signed request (document 110) to the data owner, (i.e.: received at 25).

Second, data owner facility 30 is operated by a data owner. (The data owner is someone who owns the data and controls access to the data but does not necessarily hold or host the data themselves). The data owner facility 30 is used by the data owner to create permission conditions 33 for accessing the data in the data storage facility. Such permission conditions may spell out which users can access which data or the conditions/uses for which they may be permitted to access the data. When the request 100 and signature 23 are received by the data owner at 25, the data owner then proceeds to verify the digital signature 23 on request 100 by using data user's public key received in 24. If the digital signature 23 is successfully verified with this key, then the request 21 (in document 100) really came from the user and has not been altered in any way, at 34.

Next, at 35, the data owner optionally verifies the identity of the user in case the identity of the user is required to determine if the user should gain access to the data, or his request, 100, should be granted. Next, at 36, the data owner compares its permission conditions 33 with the request 100 to determine whether the request to access data meets the permission conditions and should therefore be granted. The request may consist of multiple parts, all contained inside document 100. Assuming that the permission conditions are met and the decision is made (by the data owner) to allow the data user access to the data, or permission to carry out the operations described in the request, then the following occurs. First, the data owner appends it's own public key, or public certificate (which contains the public key) to the request (65 in FIGS. 2 and 3), creating 120. Secondly, the data owner uses it's own private key (300 in FIG. 3) to compute a digital signature of the access request signature, and includes the data user's digital signature in the computation of the new signature. Optionally, the data owner may include conditions of use in the computation of the signature as well. If so, the conditions of use are also appended to the token (66 in FIGS. 2 and 3) and included in the computation of the digital signature. Conditions of use may include time periods of validity and an URL against which to check it the token is still valid in case the owner would like to have the option of revoking the token's validity. The data owner signs document 120 and attaches this new signature (at 37) thereby creating a portable data access token 39 (comprising document 130). Next, at 40, the created portable data access token 39 is sent from data owner facility 30 back to data user facility 20. The data user then takes the data owner's public key, received at 24, and uses this key to verify the data owner's signature on the data access token (at 41). If the signature can successfully be validated with this key, the owner's public key from 24 is compared to the owner public key contained in the token 39. It the two keys are identical and the signature 37 can be validated with them, the data access token can with confidence be considered to be signed by the data owner, at 42. The user may store the token for repeated and future use.

Third, at 44, the data user then contacts the data storage and management entity 53. The data user and the data management entity then engage in a mutual exchange of their respective public keys with public-private cryptographic validation to ensure that the other party is in possession of the private key corresponding to the public key received. Optionally if the public keys are transmitted in the form of digital certificates, the other party's possession of their respective private keys is established with an SSL handshake, at 50.

The data user then sends the portable data access token 39 to the data storage and management facility 53, along with the specific request the user wishes to make, at 51. To use the token to authorize a request the request must be either identical to at least one request in 100, or the logical subset of at least one request in 100. An example would be where one of the requests in 100 is for access to a whole collection of files identified by some common denominator. Perhaps a complete collection of episodes of a particular TV series. Where each episode is contained on separate files. The user's token then allows access to the whole collection of files containing the entire TV series, but the users specific request 51 may be to read only one particular file containing one specific episode.

Another example of a request being the logical subset of a request contained in 100 would be where the token contains the approval of the request to read an entire database table 21 and the specific user request 51 is for reading some subset of rows in that same database table.

The management facility uses the public key obtained at 50 to validate the user's signature in the data access token 130, at 55. If the signature is successfully validated with the key in the user's public key, the data access token 130 can with confidence be considered to both belong to the user and have come from the user: The user is now considered authorized to use the token by virtue of being in possession of the private key that created signature 23. Additional authorization is not required. If the signature validation fails, the operation terminates. Next the management entity examines the specific request 51 the user wishes to make. The request 51 is matched against the requests inside the data access token (21 in FIG. 2), at 56. If the request matches at least one of the requests in the data access token, or is a subset of at least one of the requests in the data access token, the request is considered eligible to be granted by using the data access token, at 57, subject to any usage conditions in 66. If the requests is not eligible to be granted by using the data access token, the operation terminates.

The data (200) requested by the user is retrieved along with the digital signature the data owner has attached to it (201). At 58, the public key of the data owner retrieved from the security token (65) is used to validate the data owner's digital signature on the requested data (201) as well as the data owner's digital signature on the data user's data access token (37). If both signatures can be validated by the exact same public key, then the data access token and the requested data have been signed with the exact same private key belonging to the data owner, at 59. The checking of the digital signature of the data owner (37) verifies that the token has in no way been altered since the data owner passed it back to the user.

The private key of the data owner is assumed to be under the secure control of the data owner and the data owner is therefore concluded to have approved the requests contained in the data access token for the user whose private key also signed the data access token. The user making the request has by the use of cryptographic handshake/exchange 50 been established to be the user who is in possession of the private key.

The management entity then reads any usage conditions 66 in the data access token. These conditions may include time limitations or URLs to check for revocation of the access token by the data owner, at 60. If the usage conditions are met the user is then considered approved by the data owner for all the requests contained in the data access token, or any subset of any of those requests.

If the user's specific requests is among them (established in 56) the user's request is granted by the management entity. The management entity need consult no external entities except where this is mandated by usage conditions 66. The operation requested by the user is carried out.

FIG. 2 illustrates further details of the portable data access token, as follows. Token 39/130 is created by the data user first requesting data access. Optionally, this request 21 is contained an XML document, being document 100. The data user then digitally signs this document with the user's own private key and affix the resultant digital signature 23, creating document 110. Next, document 110 is sent from the data user's facility 20 to the data owner's facility 30. At facility 30, the data owner adds their own public certificate 65 and any optional conditions of use 66, creating document 120. Usage conditions 66 may optionally be an XML document as well. Next, the data owner digitally signs document 120 with the owner's own private key, affixing the resultant digital signature 37, thereby creating document 130. Document 130 may also be an XML document. The addition of the data owners digital signature 37 to document 120 creates the portable data access token 130. This portable data access token is then sent back to the data user, and the data user can then use it by sending it to the third party data holder when later requesting access to the data.

In accordance with the present invention, the data owner, the data user and the third party data holder are three separate persons/corporations or entities. The main advantage of the present system is that the third party in possession of the data is able to grant selective, authorized access to various data users without even knowing the identity either the user or the actual owner of the data. In addition, the data owner simply determines who will be granted access to the data and under what conditions without having to host their own data themselves. Thus, in contrast to existing systems, the data owner and data holder/hoster operate separately from one another, but with various data user's access to the data being securely controlled. As the host can check the users authority to access the data without having to connect to any other entity means that users can be authorized on a device that is not connected to any network.

The entity that hosts data and enforce access control need not authenticate a user for a user to be authorized for access, using the token and process described in this document. As maintaining records of users and authenticating users against these records is expensive this feature is a considerable saving.

If usage conditions 66 contain time limitations (for example, by setting an expiry date), and the users access token and request is supplied though a physically attached device (such as a card reader). The management entity can function and administer access and enforce time restriction even when it is not connected to a data network.

Turning next to FIG. 3, 210 is in the data holder's possession. It shows data 200 with a digital signature 201 computed on 200 using the data owner's private key 300. Data holder keeps 200 and 201 together such that any request 51 to access 200 can only be done by a user presenting a valid token 130 and the signature 37 on the token and the signature on the data 201 can be validated with the same key. Element 130 shows the security token. With the digital signature 37 computed on 120 using the data owner's private key 300. 300 is the data owner's private key. 400 is the user's private key and is the same key that was used to create the digital signature 23.

The data access token 130 is valid for access to the data 200 if the public key 65 can validate BOTH signatures 201 and 37. These signature validations establishes that the owner's private key 300 corresponding to the public key 65 was used create both signatures 201 and 37. With the private key 300 under the control of the data owner, the data owner must therefore also have approved the request 21, or multiple request 100, contained in the security token.

A user is entitled to use the token 130 if the user can through cryptographic key exchange present and establish ownership of the public key 401 that can validate the digital signature 23. 410 shows the communication the user is sending to the data management entity where 51 is the actual request and 401 is the user's public key.

Dashed lines show link between private keys and the digital signatures created with them. Solid lines show link between public-private key pairs. Arrows show link between key and digital signature validated by that key, performed by the data holder.

The user's request is granted by the data holder if the user's actual request sent to the data holder 51 is either identical to 21 or a logical subset of 21 and if the request meets the usage conditions in 66, if there are any.

What is claimed is:

1. A data storage system for controlling access to data, comprising:
   (a) a data user facility operated by a data user, the data user facility being configured for the data user to:
      (i) create a request to access data in a data storage facility,
      (ii) attach a data user digital signature to the request to access data by signing the digital signature using a private key belonging to the data user, and
      (iii) send both the digitally signed request to access data and the data user's public key to a data owner;
   (b) a data owner facility operated by a data owner, the data owner facility being configured for the data owner to:
      (i) create permission conditions for accessing the data in the data storage facility,
      (ii) receive the digitally signed request to access data and the data user's public key from the data user,
      (iii) verify that the public key belongs to the data user though a PKI cryptographic handshake;
      (iv) verify the digital signature on request using the data user's public key;
      (v) compare the permission conditions with the digitally signed request to access data to determine whether the request to access data meets the permission conditions and should therefore be granted, and if the request to access data is granted, therefore:
      (vi) attach the data owner's public key,
      (vii) attach usage conditions, and
      (viii) attach a digital signature to the digitally signed request, including attachments by signing the document using a private key belonging to the data owner, thereby creating a portable data access token, wherein the portable data access token comprises the request and the digital signatures of both the data user and the data owner, and
      (ix) send the portable data access token to the data user; and
   (c) a data storage and management facility operated by a third party data holder; the data storage and management facility being configured for the third party data holder to:
      (i) receive the request from the data user,
      (ii) receive the portable data access token from the data user;
      (iii) receive from the data user the public key belonging to the user and verify through a PKI cryptographic handshake that the public key belongs to the user;
      (iv) verify the data user's digital signature in the data access token using the data user's public key, thereby establishing the data user's right to use the token,
      (v) identify the resource accessed by the request and retrieve the digital signature this resource bears, and
      (vi) extract the owner's public key from the data access token and use this public key to verify both the data owner's signature on the data access token and the digital signature on the accessed resource, wherein, in the event both these signatures can be verified with the same public key, establish that the data access token can be used to access the resource;
      (vii) verify the request to access data is contained in the portable data access token, or is a logical subset of a request contained in the data access token, thereby establishing that the data user is making a data request that is authorized by the portable data access token and therefore also authorized by the data owner; and then, (viii) verify that usage conditions in the data access token are met, (ix) grant the data user access to the requested data, alternatively carry out the request the user is making.

2. The data storage system of claim 1, wherein the data owner, the data user and the third party data holder are three separate entities.

3. The data storage system of claim 1, wherein the data user's request for data access is an XML document.

4. The data storage system of claim 1, wherein the data owner's permission conditions are XML documents.

5. The data storage system of claim 1, wherein the security tokens are XML documents.

6. The data storage system of claim 1, wherein the data resources are configured to bear the digital signature of their owner.

7. The data storage system of claim 6, where the data storage facility is configured for the data holder to grant the data user access to the data on the basis of the conditions of use attached to the request to access data.

8. The data storage system of claim 1, wherein the data holder does not know the data user or the data owner.

9. The data storage system of claim 1, wherein the data holder is not in contact with the data owner.

10. A method of controlling access to data, comprising:

(a) having a data user create a data request;

(b) having the data user sign the data request with a private key belonging to the data user, thereby credentialing the data request;

(c) sending the credentialed data request from the data user to the data owner;

(d) sending the data user's public key to the data owner;

(e) having the data owner verify the data user's public key through cryptographic handshake with the data user;

(f) having the data owner verify the identity of the data user by verifying the digitally signed request using the data user's public key;

(g) having the data owner approve the request of the data user;

(h) having the data owner create a statement of conditions of use governing the user's request and attaching this statement to the user's signed request;

(i) having the data owner sign the signed data request and usage conditions with a private authentication key belonging to the data owner, thereby creating a portable data access token, wherein the portable data access token comprises the data request, conditions of use, and the digital signatures of both the data user and the data owner;

(j) having the data owner send the portable data access token to the data user;

(k) having the data user send the portable data access token to a data holder;

(l) having the data holder verify the data user's public key, thereby establishing that public key belongs to the data user;

(m) having the data holder verify the request to access data is contained in the portable data access token, or is a logical subset of a request contained in the portal data access token, thereby establishing that the data user is making the same data request that is authorized by the portable data access token; and then, (n) verify the data owner's signature on the data access token with the owner's public key contained in the token;

(o) having the data holder identify the requested data and verify the digital signature on the data with the owner's public key from the data access token, (p) grant the data user access to the requested data.

11. The method of claim 10, wherein having the data owner sign the data request with a private key comprises:

(i) having the data owner create permission conditions for accessing the data, and then, (ii) having the data owner compare the permission conditions with the request to access data to determine whether the request to access data meets the permission conditions and should therefore be granted.

12. The method of claim 10, wherein the data holder does not know the data user or the data owner.

13. The method of claim 10, wherein the data holder is not in contact with the data owner.

\* \* \* \* \*